United States Patent
Chmora et al.

(10) Patent No.: US 7,738,663 B2
(45) Date of Patent: Jun. 15, 2010

(54) LIGHT-WEIGHT KEY DISTRIBUTION SCHEME IN WIRELESS NETWORK

(75) Inventors: Andrey L. Chmora, Moscow (RU); Alexei V. Ourivski, Ozerv (RU)

(73) Assignee: Samsung Electronics, Co., Ltd., Suwon-si (KR)

( * ) Notice: Subject to any disclaimer, the term of this patent is extended or adjusted under 35 U.S.C. 154(b) by 947 days.

(21) Appl. No.: 11/053,676

(22) Filed: Feb. 9, 2005

(65) Prior Publication Data

US 2005/0177751 A1 Aug. 11, 2005

(30) Foreign Application Priority Data

Feb. 9, 2004 (RU) ............................. 2004103558

(51) Int. Cl.
*H04L 9/08* (2006.01)
(52) U.S. Cl. .................... 380/278; 380/277; 380/279
(58) Field of Classification Search .................. 356/10; 713/163; 380/270, 277, 278, 44, 279; 707/2
See application file for complete search history.

(56) References Cited

U.S. PATENT DOCUMENTS

2005/0140964 A1* 6/2005 Eschenauer et al. ........... 356/10
2007/0078817 A1* 4/2007 Girao et al. .................. 707/2

OTHER PUBLICATIONS

L. Eschenauer, V. Gligor. A Key Management Scheme for Distributed Sensor Networks.-Proceedings of the 9-th ACM conference CCS2002, 2002, 41-47.*

K. A. S. Quinn. Bounds for Key Distribution Patterns.-Journal of Cryptology, vol. 12(4), 1999, 227-240.*

L. Gong, D. J. Wheeler. A matrix Key Distribution Scheme.-Journal of Cryptology, vol. 2(2), 1990, 51-59.*

M. Dyer, T. Fenner, A. Frieze, and A. Thomason. On Key Storage in Secure Networks.-Journal of Cryptology, vol. 8(4), 1995, 189-199.*

Valeri Korjik, Michael Ivkov, Yuri Merinovich, Alexander Barg, Henk C.A. van Tiborg, A Broadcast Key Distribution Scheme Based on Block Designs, Proceedings of the 5th IMA Conference on Cryptography and Coding, p. 2-12, Dec. 18-20, 1995.*

Valeri Korjik, Michael Ivkov, Yuri Merinovich, Alexander Barg, henk C. A. van Tiborg, A Broadcast Key Distribution Scheme Based on Block Designs, Proceedings of the 5th IMA Conference on Cryptography and Coding, p. 2-12, Dec. 18-20, 1995.*

(Continued)

*Primary Examiner*—Brandon S Hoffman
*Assistant Examiner*—Hee Song
(74) *Attorney, Agent, or Firm*—NSIP Law

(57) ABSTRACT

A method of reducing the number of security keys allocated to each node of a wireless network, and of reducing the number of security keys that are required by the wireless network. N nodes are grouped into a first and a second groups, each group comprising N/2 nodes without nodes being shared. The first group is grouped such that at least two nodes are included and at least one node is different, and first security keys are allocated to the first group nodes without any security keys being shared among the groups. (N/2) groups are grouped to include a security key arrangement of (B/2) number of security keys of B number of second security keys, and the second security keys of each group are allocated to each node of the first group. Here, the security key arrangement of each group differs from that of the others.

6 Claims, 2 Drawing Sheets

| | FIRST NODE | SECOND NODE | THIRD NODE | FOURTH NODE | FIFTH NODE | SIXTH NODE | SEVENTH NODE | EIGHTH NODE |
|---|---|---|---|---|---|---|---|---|
| FIRST SECURITY KEY | 1 | 1 | 0 | 0 | 1 | 1 | 0 | 0 |
| SECOND SECURITY KEY | 1 | 0 | 1 | 0 | 1 | 0 | 1 | 0 |
| THIRD SECURITY KEY | 1 | 0 | 0 | 1 | 1 | 0 | 0 | 1 |
| FOURTH SECURITY KEY | 0 | 1 | 1 | 0 | 0 | 1 | 1 | 0 |
| FIFTH SECURITY KEY | 0 | 1 | 0 | 1 | 0 | 1 | 0 | 1 |
| SIXTH SECURITY KEY | 0 | 0 | 1 | 1 | 0 | 0 | 1 | 1 |
| SEVENTH SECURITY KEY | 1 | 1 | 1 | 1 | 0 | 0 | 0 | 0 |
| EIGHTH SECURITY KEY | 1 | 1 | 1 | 1 | 0 | 0 | 0 | 0 |
| NINTH SECURITY KEY | 1 | 0 | 0 | 0 | 0 | 1 | 1 | 1 |
| TENTH SECURITY KEY | 0 | 1 | 0 | 0 | 1 | 0 | 1 | 1 |
| ELEVENTH SECURITY KEY | 0 | 0 | 1 | 0 | 1 | 1 | 0 | 1 |
| TWELFTH SECURITY KEY | 0 | 0 | 0 | 1 | 1 | 1 | 1 | 0 |

0 : SECURITY KEY NOT ALLOCATED
1 : SECURITY KEY ALLOCATED

OTHER PUBLICATIONS

L. Eschenauer, V. Gilgor. A Key management Scheme for Distributed Sensor Networks. Procedings of the 9th ACM Conference CCS2002, 2002, 41-47.*

K. A. S. Quinn. Bounds for Key Distribution Patterns. Journal of Cryptology, vol. 12(4), 1999, 227-240.*

L. Gong, D. J. Wheeler. A matrix key Distribution Scheme, Journal of Cryptology, vol. 2(2), 1990, 51-59.*

M. Dyer, T. Fenner, A. Frieze, and A. Thomason. On Key Storage in Secure Networks. Journal of Cryptology, vol. 8(4), 1995, 189-199.*

Linda Morales et al., "Combinatorial Optimization of multicast Key Manageent", Proceedings of the 36th Hawaii Inernational Conference on System Sciences (HICSS'03), IEEE, 2002.*

L. Eschenauer, V. Gilgor. A Key Management Scheme for Distributed Sensor Networks. Proceedings of the 9th ACM Conference CCS2002, 2002, 41-47.*

L. Gong, D. J. Wheeler. A Matrix Key Distribution Scheme, Journal of Cryptology, vol. 2(2), 1990, 51-59.*

M. Dyer, T. Fenner, A. Frieze, and A. Thomason. On Key Storage in Secure Networks. Journal of Cryptology, vol. 8(4), 1995, 189-199.*

Linda Morales et al., "Combinatorial Optimization of Multicast Key Management," Proceedings of the 36th Hawaii International Conference on System Sciences (HICSS'03), IEEE, 2002.*

Eltowweissy et al., "Lightweight Key Management for Wireless Sensor Networks", Performance, Computing, and Communications, 2004 IEEE International Conference, pp. 813-818. 2004.*

* cited by examiner

|  | FIRST NODE | SECOND NODE | THIRD NODE | FOURTH NODE |
|---|---|---|---|---|
| FIRST SECURITY KEY | 1 | 1 | 0 | 0 |
| SECOND SECURITY KEY | 1 | 0 | 1 | 0 |
| THIRD SECURITY KEY | 1 | 0 | 0 | 1 |
| FOURTH SECURITY KEY | 0 | 1 | 1 | 0 |
| FIFTH SECURITY KEY | 0 | 1 | 0 | 1 |
| SIXTH SECURITY KEY | 0 | 0 | 1 | 1 |

0 : SECURITY KEY NOT ALLOCATED
1 : SECURITY KEY ALLOCATED

FIG. 3

|  | FIRST NODE | SECOND NODE | THIRD NODE | FOURTH NODE | FIFTH NODE | SIXTH NODE | SEVENTH NODE | EIGHTH NODE |
|---|---|---|---|---|---|---|---|---|
| FIRST SECURITY KEY | 1 | 1 | 0 | 0 | 1 | 1 | 0 | 0 |
| SECOND SECURITY KEY | 1 | 0 | 1 | 0 | 1 | 0 | 1 | 0 |
| THIRD SECURITY KEY | 1 | 0 | 0 | 1 | 1 | 0 | 0 | 1 |
| FOURTH SECURITY KEY | 0 | 1 | 1 | 0 | 0 | 1 | 1 | 0 |
| FIFTH SECURITY KEY | 0 | 1 | 0 | 1 | 0 | 1 | 0 | 1 |
| SIXTH SECURITY KEY | 0 | 0 | 1 | 1 | 0 | 0 | 1 | 1 |
| SEVENTH SECURITY KEY | 1 | 1 | 1 | 1 | 0 | 0 | 0 | 0 |
| EIGHTH SECURITY KEY | 1 | 1 | 1 | 1 | 0 | 0 | 0 | 0 |
| NINTH SECURITY KEY | 1 | 0 | 0 | 0 | 0 | 1 | 1 | 1 |
| TENTH SECURITY KEY | 0 | 1 | 0 | 0 | 1 | 0 | 1 | 1 |
| ELEVENTH SECURITY KEY | 0 | 0 | 1 | 0 | 1 | 1 | 0 | 1 |
| TWELFTH SECURITY KEY | 0 | 0 | 0 | 1 | 1 | 1 | 1 | 0 |

| 0 : SECURITY KEY NOT ALLOCATED |
| 1 : SECURITY KEY ALLOCATED |

LIGHT-WEIGHT KEY DISTRIBUTION SCHEME IN WIRELESS NETWORK

CROSS-REFERENCE TO RELATED APPLICATIONS

This application claims the benefit of Russian Application No. 2004103558, filed Feb. 9, 2004, in the Russian Patent Office, the disclosure of which is incorporated herein by reference.

BACKGROUND OF THE INVENTION

1. Field of the Invention

An aspect of the present invention relates to a distribution of security keys among nodes of a wireless network. More particularly, an aspect of the present invention proposes a scheme aiming to reduce a number of security keys for storages in each node.

2. Description of the Related Art

Nodes of a wireless network set security keys to protect data from a malicious third party during transmission and reception of the data. In other words, each node encrypts data using set security keys and then transmits the encrypted data. Therefore, with the use of these nodes, data may be transmitted and received safely from the harm of the malicious party.

Currently available schemes to set security keys for the nodes of a wireless network, or, more particularly, of an ad-hoc network, will be briefly described below.

First, each node may set a security key using a channel other than a channel to be used for data transmission. In other words, the nodes may set security keys using infrared rays or using lines. In these cases, the nodes are located at a short transmission distance and therefore, intrusion of an unwanted third party may be generally avoided. However, such a short transmission distance also works as a disadvantage because the coverage of nodes setting security keys is limited to only within a short distance.

The nodes may set security keys by a direct contact, or using human body as a channel. In other words, the nodes may set security keys using an electric current flowing in a human body that contacts the node. This scheme, however, provides a restriction that a separate channel needs to be used in addition to channels for communication among the nodes.

Secondly, a sending node and a receiving node may transmit and receive data using a public key. However, in this scheme, a large amount of computations for data encryption or decryption are required.

Meanwhile, RSA is an encryption code which has been developed by Ron Rivest, Adi Shamir and Leonard Adleman. The RSA mainly utilizes the fact that the resolution of large integers into factors is difficult and is currently popular. However, the elliptical curve cryptography and resolution into factors with 514-bits have recently attacked the RSA, and therefore, a larger modulus 'n' was used to construct a safer RSA cryptography system. Accordingly, 1024-bit security keys are currently used.

FIG. 1 illustrates nodes constructing a wireless network. According to FIG. 1, a wireless network includes a first node 101, a second node 102, a third node 103, and a fourth node 104. A method to operate these nodes in a conventional wireless network so as to set security keys will now be described. First, all the nodes of a wireless network may allocate identical security keys. Accordingly, the first to fourth nodes 101-104 are allocated with the same security key. That is, when the first node 101 has data to transmit to the second to fourth nodes 102-104, the first node 101 encrypts data using one security key and transmits the encrypted data. By doing so, the number of security keys to be stored in each node may be minimized. In other words, one security key is stored in each of the nodes even when the number of nodes increases in a wireless network. Accordingly, the wireless network also requires one security key.

However, sharing a single security key among the first to fourth nodes 101-104 is accompanied with a security risk because the security key of all nodes is exposed when even one node exposes the security key thereof. Accordingly, a solution to this problem is demanded.

Secondly, nodes of a wireless network may be allocated with different security keys, which is illustrated in FIG. 2. Here, a wireless network allocates first to sixth security keys that are stored in the respective nodes. Namely, the first to third security keys are allocated to the first node 101, and the first, fourth and fifth security keys are allocated to the second node 102. The second, fourth and sixth security keys are allocated to the third node 103, and the third, fifth, and sixth security keys are allocated to the fourth node 104.

The first node 101 uses the first security key to transmit data to the second node 102, uses the second security key to transmit data to the third node 103, and uses the third security key to transmit data to the fourth node 104. The second node 102 uses the first security key to transmit data to the first node 101, uses the fourth security key to transmit data to the third node 103, and uses the fifth security key to transmit data to the fourth node 104. The third node 103 uses the second security key to transmit data to the first node, uses the fourth security key to transmit data to the third node 103, and uses the sixth security key to transmit data to the fourth node 104. The fourth node 104 uses the third security key to transmit data to the first node 101, uses the fifth security key to transmit the data to the second node 102, and uses the sixth security key to transmit data to the third node 103.

By allocating a pair of nodes with their own security keys, all the other security keys may remain hidden even when a certain security key is exposed. However, as the number of nodes increases in a wireless network, the number of security keys to be stored in the nodes also increases, and therefore, the number of security keys required by the wireless network also increases. The following equation 1 shows the number of security keys required to be stored in each node when the number of nodes is 'N'.

[Equation 1]

Number of security keys required to be stored in each node=$N-1$

The following equation 2 shows the number of security keys required by a wireless network when the number of nodes of the wireless network is 'N'.

[Equation 1]

Number of security keys required in wireless network=$(N-1)+(N-2)+\ldots+1$

As may be inferred from the equation 1, a number of security keys required to be stored in each node increases when a number of nodes of a wireless network increases. And as inferred from the equation 2, a number of security keys required in a wireless network increases geometrically when a number of nodes of a wireless network increase. Accordingly, a method is required to reduce number of required security keys when the number of wireless network nodes increases.

SUMMARY OF THE INVENTION

An aspect of the present invention provides a method to reduce a number of required security keys when a number of nodes increase in a wireless network.

Another aspect of the present invention provides a method to reduce number of security keys to be allocated to each node when the number of nodes of a wireless network increases.

Accordingly, in order to achieve the above-mentioned aspects and/or other features of the present invention, a method to allocate a security key to each node of a communication system having N nodes, includes: grouping N nodes into first and second groups, each group comprising N/2 nodes without nodes being shared; grouping the first group such that at least two nodes are included and at least one node is different, and allocating first security keys to the first group nodes without security keys being shared among the groups; and grouping (N/2) groups, each of which including a security key arrangement of (B/2) number of security keys of B number of second security keys, with the security key arrangement of each group differing from that of the others, and allocating the second security keys of each group to each node of the first group.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a view illustrating an exemplary embodiment in which security keys are allocated to each node of a wireless network having eight nodes.

DETAILED DESCRIPTION OF THE EMBODIMENTS

Figures 1, 2:
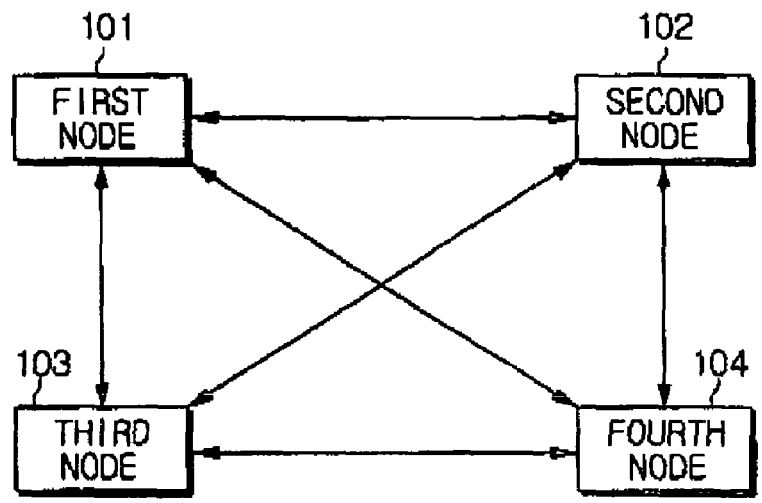
FIG. 1 is a view illustrating nodes of a conventional wireless network.
FIG. 2 is a view illustrating an exemplary embodiment in which security keys are allocated to each node of a wireless network having four nodes.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As illustrated below, according to an embodiment of the present invention a half-weight column generates a security key because a half-weight column performs a distribution of security keys among nodes of a wireless network. The half-weight column refers to a column in which elements '0' and elements '1' are arranged in an identical number. The example below will help explain the present invention in more detail. The following mathematical formula 3 illustrates one example of a half-weight column having six elements therein.

$$\begin{bmatrix} 0 \\ 0 \\ 1 \\ 1 \\ 0 \\ 1 \end{bmatrix}$$ [Mathematical formula 3]

The following mathematical formula 4 illustrates one example of a half-weight column having eight elements therein.

$$\begin{bmatrix} 0 \\ 1 \\ 1 \\ 1 \\ 0 \\ 1 \\ 0 \\ 0 \end{bmatrix}$$ [Mathematical formula 4]

The following mathematical formula 5 illustrates one example of a half-weight column having ten elements therein.

$$\begin{bmatrix} 0 \\ 0 \\ 0 \\ 1 \\ 0 \\ 0 \\ 1 \\ 1 \\ 1 \\ 1 \end{bmatrix}$$ [Mathematical formula 5]

As may be inferred from mathematical formulas 3 to 5, elements '0' and elements '1' are arranged in the column in an identical number. In other words, in each column there are an equal number of zeros and ones. The following mathematical formula 6 illustrates one example of a half-weight column having six elements of 20 rows each therein.

$$\begin{bmatrix} 0 & 1 & 0 & 0 & 1 & 1 & 1 & 1 & 1 & 1 & 1 & 0 & 0 & 0 & 0 & 0 & 0 & 1 & 1 \\ 1 & 0 & 1 & 1 & 1 & 1 & 1 & 1 & 0 & 0 & 0 & 1 & 0 & 0 & 0 & 0 & 1 & 1 & 0 & 0 \\ 1 & 0 & 0 & 1 & 1 & 0 & 0 & 0 & 1 & 1 & 1 & 1 & 0 & 1 & 1 & 1 & 0 & 0 & 0 & 0 \\ 0 & 0 & 0 & 1 & 0 & 1 & 0 & 0 & 1 & 0 & 0 & 0 & 1 & 0 & 1 & 1 & 1 & 1 & 1 & 1 \\ 1 & 1 & 1 & 0 & 0 & 0 & 1 & 0 & 0 & 1 & 0 & 0 & 1 & 1 & 0 & 1 & 0 & 1 & 0 & 1 \\ 0 & 1 & 1 & 0 & 0 & 0 & 0 & 1 & 0 & 0 & 1 & 1 & 1 & 1 & 1 & 0 & 1 & 0 & 1 & 0 \end{bmatrix}$$ [Mathematical formula 6]

The following mathematical formula 7 illustrates one example of a matrix (hereinafter called a 'half-weight matrix') which includes random parts of columns extracted from those of the half-weight column of mathematical formula 6.

$$\begin{bmatrix} 1 & 1 & 1 & 1 \\ 1 & 1 & 1 & 1 \\ 1 & 0 & 0 & 0 \\ 0 & 1 & 0 & 0 \\ 0 & 0 & 1 & 0 \\ 0 & 0 & 0 & 1 \end{bmatrix}$$ [Mathematical formula 7]

One will understand that the mathematical formula 7 represents a (46×4) half-weight matrix.

The following mathematical formula 8 illustrates one example of a complementary matrix of the half-weight matrix of the mathematical formula 7. The complementary matrix contains elements '0' that have been converted into element '1', and elements '1' that have been converted into elements '0'.

$$\begin{bmatrix} 0 & 0 & 0 & 0 \\ 0 & 0 & 0 & 0 \\ 0 & 1 & 1 & 1 \\ 1 & 0 & 1 & 1 \\ 1 & 1 & 0 & 1 \\ 1 & 1 & 1 & 0 \end{bmatrix}$$ [Mathematical formula 8]

The original matrix is hereinafter referred to as 'B', and the complementary matrix is hereinafter referred to as '$\overline{B}$'.

The present invention proposes to generate security keys by use of the following mathematical formula 9.

$$\begin{bmatrix} A & A \\ B & \overline{B} \end{bmatrix}$$ [Mathematical formula 9]

'A' is a minimum matrix required to allocate security keys to a plurality of nodes and, in greater detail, is a matrix to be used in allocating the first security keys to N/2 numbers of nodes. This will be explained in greater detail below with reference to an embodiment of the invention in which a set of security keys are to be allocated to six nodes. First, security keys will be allocated to three nodes. A method of allocating these security keys to the three nodes will now be explained.

First, the following mathematical formula 10 represents a method to allocate security keys to three nodes.

$$A = \begin{bmatrix} 1 & 1 & 0 \\ 1 & 0 & 1 \\ 0 & 1 & 1 \end{bmatrix}$$ [Mathematical formula 10]

In the matrix represented by the mathematical formula 10, element '1' indicates that a corresponding security key is allocated, while element '0' indicates no allocation of the corresponding security key. In other words, element '1' at the first row allocates the first security key, and element '1' at the second row allocates the second security key. Element '1' at the third row allocates the third security key. Additionally, the first column of the matrix represents security keys allocated to the first node, and the second column represents security keys allocated to the second node. The third column represents the security keys allocated to the first third node. More specifically, as shown in the matrix, the first and second security keys are allocated to the first node, and the first and third security keys are allocated to the second node. The second and third security keys are allocated to the third node.

It is known that when a wireless network includes N nodes, the number of elements of the columns is (N−2). It follows then, that when there are six nodes in a wireless network, a half-weight matrix having 4 elements in the columns of the matrix, is obtained.

The following mathematical formula 11 represents a half-weight matrix which has four elements in a column.

$$\begin{bmatrix} 1 & 1 & 1 & 0 & 0 & 0 \\ 1 & 0 & 0 & 1 & 1 & 0 \\ 0 & 1 & 0 & 1 & 0 & 1 \\ 0 & 0 & 1 & 0 & 1 & 1 \end{bmatrix}$$ [Mathematical formula 11]

The following mathematical formula 12 represents a (4×43) matrix using columns that are randomly extracted from those of the mathematical formula 11.

$$B = \begin{bmatrix} 1 & 1 & 1 \\ 1 & 0 & 0 \\ 0 & 1 & 0 \\ 0 & 0 & 1 \end{bmatrix}$$ [Mathematical formula 12]

The following mathematical formula 13 represents a complementary matrix of that of the mathematical formula 12.

$$\overline{B} = \begin{bmatrix} 0 & 0 & 0 \\ 0 & 1 & 1 \\ 1 & 0 & 1 \\ 1 & 1 & 0 \end{bmatrix}$$ [Mathematical formula 13]

The following mathematical formula 14 represents security keys which are allocated to the six nodes by using the mathematical formula 9.

$$\begin{bmatrix} A & A \\ B & \overline{B} \end{bmatrix} = \begin{bmatrix} 1 & 1 & 0 & 1 & 1 & 0 \\ 1 & 0 & 1 & 1 & 0 & 1 \\ 0 & 1 & 1 & 0 & 1 & 1 \\ 1 & 1 & 1 & 0 & 0 & 0 \\ 1 & 0 & 0 & 0 & 1 & 1 \\ 0 & 1 & 0 & 1 & 0 & 1 \\ 0 & 0 & 1 & 1 & 1 & 0 \end{bmatrix}$$ [Mathematical formula 14]

The security keys being allocated to each node by using the mathematical formula 14 may be listed as the following table.

TABLE 1

|  | 1st node | 2nd node | 3rd node | 4th node | 5th node | 6th node |
|---|---|---|---|---|---|---|
| 1st security key | 1 | 1 | 0 | 1 | 1 | 0 |
| 2nd security key | 1 | 0 | 1 | 1 | 0 | 1 |
| 3rd security key | 0 | 1 | 1 | 0 | 1 | 1 |
| 4th security key | 1 | 1 | 1 | 0 | 0 | 0 |
| 5th security key | 1 | 0 | 0 | 0 | 1 | 1 |
| 6th security key | 0 | 1 | 0 | 1 | 0 | 1 |
| 7th security key | 0 | 0 | 1 | 1 | 1 | 0 |

In the above table 1, element '1' indicates that a corresponding security key is allocated to a respective node, while element '0' indicates no allocation of the corresponding security key to the respective node. When each node is allocated with security keys as in the table 1, a node pair intending to communicate uses an identical security key among the allocated keys for the communication.

More specifically, when the first and second nodes intend to communicate with each other, the nodes use the first and fourth security keys to aid in the communication. When the third and fourth nodes intend to communicate with each other, the nodes use the second and seventh security keys to aid in the communication. When the fifth and sixth nodes intend to communicate, the nodes use the third and fifth security keys to aid in the communication.

Accordingly, the number of security keys allocated to each node, and the number of security keys required by the wireless network, may be reduced as may be inferred from the table 1. In other words, while a conventional six-node wireless network requires 15 security keys, a wireless network according to aspects of the present invention requires only 7 security keys. Additionally, while a conventional six-node wireless network requires 5 security keys to be allocated to each node, aspects of the present invention propose allocating only 4 security keys to each node.

According to another embodiment of the invention, a set of security keys are to be allocated to eight nodes. First, however, a method to allocate security keys to four nodes will be explained. FIG. 2 illustrates a method to allocate security keys to four nodes. Furthermore, as mentioned above, the mathematical formula 6 represents a half-weight column having six elements therein, and the mathematical formula 7 represents a half-weight column having a matrix which uses a part of the columns extracted from those of the half-weight column of mathematical formula 6. The mathematical formula 8 represents a complementary weight of the mathematical formula 7.

The following mathematical formula 15 represents security keys being allocated to eight nodes by using the mathematical formula 9.

$$\begin{bmatrix} 1 & 1 & 0 & 0 & 1 & 1 & 0 & 0 \\ 1 & 0 & 1 & 0 & 1 & 0 & 1 & 0 \\ 1 & 0 & 0 & 1 & 1 & 0 & 0 & 1 \\ 0 & 1 & 1 & 0 & 0 & 1 & 1 & 0 \\ 0 & 1 & 0 & 1 & 0 & 1 & 0 & 1 \\ 0 & 0 & 1 & 1 & 0 & 0 & 1 & 1 \\ 1 & 1 & 1 & 1 & 0 & 0 & 0 & 0 \\ 1 & 1 & 1 & 1 & 0 & 0 & 0 & 0 \\ 1 & 0 & 0 & 0 & 0 & 1 & 1 & 1 \\ 0 & 1 & 0 & 0 & 1 & 0 & 1 & 1 \\ 0 & 0 & 1 & 0 & 1 & 1 & 0 & 1 \\ 0 & 0 & 0 & 1 & 1 & 1 & 1 & 0 \end{bmatrix}$$ [Mathematical formula 15]

FIG. 3 shows the security keys being allocated to each node by using the mathematical formula 15.

Again, FIG. 3 shows that the number of security keys to be allocated to each node, and the number of security keys that are required by a wireless network decrease. More specifically, while a conventional 8-node wireless network requires 28 security keys, the present invention requires only 12 security keys. Additionally, while a conventional 8-node wireless network requires 7 security keys to be allocated to each node, the present invention requires only 6 security keys to be allocated to each node.

As is described above in a few exemplary embodiments of the present invention, when security keys are allocated to each node, according to the present invention, the number of security keys to be allocated to each node and the number of security keys that are required by a wireless network may be reduced. Accordingly, each node may store respectively-allocated security keys with a use of a minimum amount of memory.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of allocating a security key to each node of a communication system having N nodes, the method comprising:

grouping N nodes into a first group and a second group, such that each group comprises N/2 nodes, no node is shared between the groups, and N is an even integer;

grouping the first group into a plurality of sub-groups, such that each of the plurality of sub-groups comprises at least two different nodes and at least one of the two different nodes differs from at least one of the nodes in other sub groups;

allocating a different first security key to each sub-group such that the first security keys are not shared among the plurality of sub-groups;

allocating, to each node of the first group, B/2 second security keys from a total of B second security keys, such that each node of the first group has a different set of B/2 second security keys, B is an even integer, and B is equal to N−2;

allocating first security keys to the nodes of the second group such that the first security keys allocated to the corresponding nodes of the second group is the same as the first security keys allocated to the corresponding nodes of the first group; and allocating, to a (K)th node of the second group, B/2 second security keys that are not allocated to a corresponding (K)th node of the first group.

2. The method of claim 1, wherein a first node communicates with a second node by using a commonly allocated security key.

3. The method of claim 1, wherein the number of the first security keys is represented by, Number of first security keys=$\{(N/2)-1\}+\{(N/2)-2\}+ \ldots +1$.

4. The method of claim 3, wherein the number of the second security keys is represented by, Number of second security keys=$N-2$.

5. The method of claim 4, wherein each node of the wireless network is allocated with $[\{(N12)-1)+\{(N/2)-2\}+ \ldots + 1]12$ of first security keys, and $(N-2)/2$ of second security keys.

6. The method of claim 1, wherein each second security key is allocated to a plurality of nodes and the amount of the plurality of nodes that the second security key is allocated to is the same for each of the second security keys.

* * * * *